Aug. 22, 1967     P. J. SCHWANENFLUGEL     3,337,777
FREQUENCY RESPONSIVE DEVICE UTILIZING A
SATURABLE CORE REACTOR AND SCR MEANS
Filed Sept. 14, 1964

WITNESSES
Edwin E. Bassler
James F. Young

INVENTOR
Paul J. Schwanenflugel
BY John L. Stoughton
ATTORNEY

United States Patent Office 3,337,777
Patented Aug. 22, 1967

3,337,777
FREQUENCY RESPONSIVE DEVICE UTILIZING A SATURABLE CORE REACTOR AND SCR MEANS
Paul J. Schwanenflugel, Belleville, N.J., assignor to Westinghouse Electric Corporation, East Pittsburgh, Pa., a corporation of Pennsylvania
Filed Sept. 14, 1964, Ser. No. 396,314
7 Claims. (Cl. 317—147)

This application relates generally to frequency responsive devices and more particularly to a frequency responsive relaying device.

In the protection of electrical utility systems it is often desired to use an underfrequency relay to detect the occurrence of a faulty operation such as might occur because of severe overloads or other abnormal system operation promptly to permit corrective steps to be taken before the faulty operation becomes too severe. Such a corrective step might be the shedding of a certain amount of the load connected to the utility system.

Frequency responsive relaying is sometimes used in instances wherein an industrial plant receives a portion of its electrical energy from a utility and generates a portion of its own electrical energy. With such an arrangement, the occurrence of a fault in the operation of the utility network which results in a reduction of its operating frequency may cause the industrially generated power to flow into the utility network. In such event it is desirable to temporarily disconnect the industrial load from the utility. Additionally, the frequency responsive relay may be used to bring the magnitude of the load in balance with the magnitude of the industrial generated energy to prevent the industrial generated energy from losing its frequency.

It is an object of this invention to provide a fast operating frequency responsive relaying apparatus.

A further object of this invention is to provide such a relaying apparatus which is extremely sensitive.

A still further object of this invention is to provide such a relaying apparatus which has a minimum of moving parts.

Figure 1:
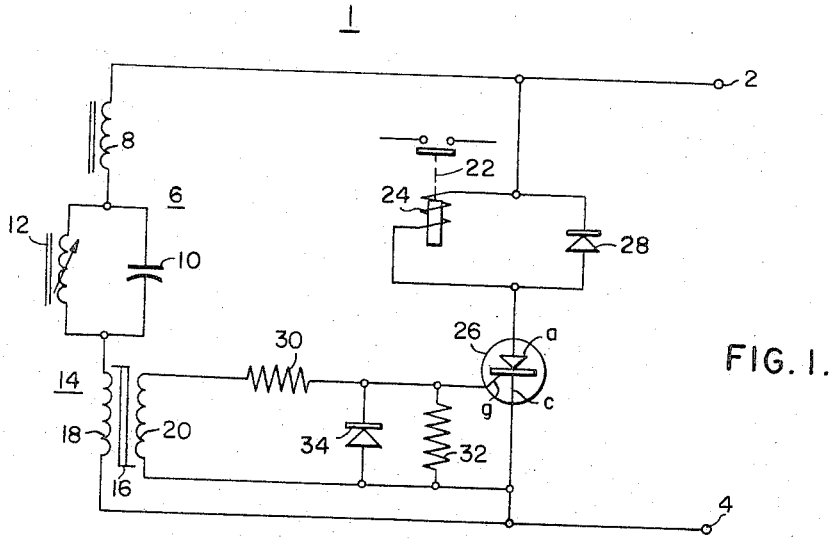
Figure 2:
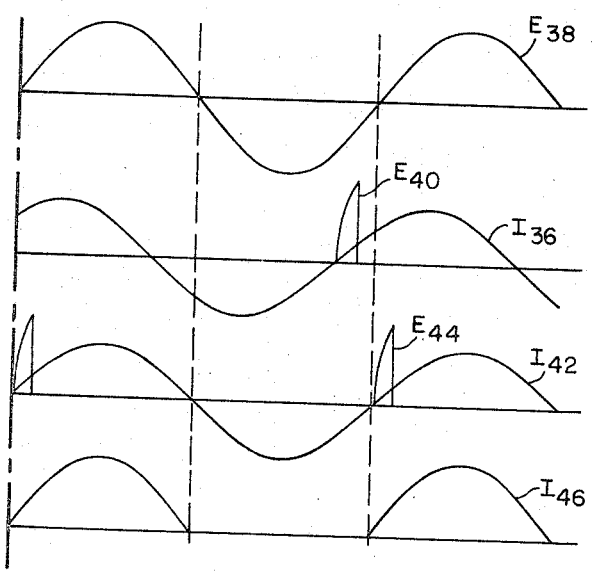

Other objects will be apparent from the specification, the appended claims and the drawings, in which drawings:

FIGURE 1 is a schematic circuit diagram of a relaying apparatus embodying the invention; and, FIG. 2 illustrates certain operating characteristics of the relaying apparatus of FIG. 1.

Referring to the drawings by characters of reference, the numerals 2 and 4 represent input terminals of the relaying apparatus 1. The input terminals 2 and 4 are adapted to be connected to the source of alternating potential to which the relaying apparatus is to respond. The frequency of the electrical quantity supplied to the apparatus 1 is sensed by a frequency responsive network 6, connected between the input terminals 2 and 4, and which comprises a first inductive reactor 8, a capacitor or capacitive reactance 10, a second inductive reactance 12, and a saturating core type of transformer 14. The capacitor 10 and reactor 12 are in parallel with each other and in series with the inductive reactor 8 and the primary winding 18 of the saturating core transformer 14. Preferably the core 16 of the transformer 14 is of a material having a substantially rectangular hysteresis loop.

A relay 22, which may be of the magnetic type, has one terminal of its energizing winding 24 connected to the terminal 2 and the other end connected to the anode $a$ of a controlled switching device 26 which may take the form of a silicon controlled rectifier. The cathode $c$ of the rectifier is connected to the terminal 4. If desired, a diode 28 may be connected in shunt with the winding 24 to pass inductive current during the half-cycle in which the controlled rectifier 26 does not conduct.

The silicon controlled rectifier 26 is of the thyratronic type insofar as when once having been rendered conducting it will remain conducting, irrespective of the discontinuance of the pulse applied between its gate and cathode, until such time as the current flow between the anode and cathode is interrupted externally of the controlled rectifier 26; as for example when its anode to cathode voltage is reversed in polarity due to its connections to an alternating potential source. For the purposes of rendering the controlled rectifier 26 conducting, its gate $g$ is connected through a resistor 30 to one terminal of the transformer secondary winding 20, the other terminal of which is connected to the cathode $c$ of the controlled rectifier 26. A resistor 32 is shunt connected between the gate $g$ and cathode $c$ and a diode 34 is connected in shunt with the resistor 32 to shunt the half-cycle pulses which are provided by the transformer 14 which are not used to render the controlled rectifier 26 conducting.

It is believed that the remainder of the details of construction may best be understood from a description of operation of the invention which is as follows. The terminals 2 and 4 are connected to a source of alternating voltage which is to have its frequency monitored. The magnitudes of the reactors 8, 10 and 12 are chosen so that, when the frequency applied to the input terminals 2 and 4 is of the normal system operating frequency, the current $I_{36}$ through the primary winding 18 of the transformer 14 leads the voltage $E_{38}$, applied between the terminals 2 and 4, by a suitable angle which will insure that the positive voltage $E_{40}$ is terminated prior to the time that the anode of the rectifier 26 is positive with respect to its cathode. This relationship is clearly shown in FIG. 2.

If the frequency of the potential applied between the terminals 2 and 4 is below the desired frequency, the current $I_{42}$ through the primary winding 18 becomes less leading and the positive voltage pulses $E_{44}$ induced in the secondary winding 20 will occur when the voltage $E_{38}$ across the controlled rectifier 26 is positive. When this occurs, the controlled rectifier will be pulsed into conduction whereby current $I_{46}$ will flow through the winding 24 to energize the relay which thereupon closes its normally open contacts for energizing a suitable control circuit (not shown). As has been suggested above, this suitable control circuit may be the control circuit of a suitable load shedding breaker. In the more generic form of the invention, any control circuit could be energized by the contacts of the relay 22.

Because the switching device or controlled rectifier 26 is of the thyratronic type, it will continue to conduct after the termination of pulse $E_{44}$ and become extinguished each time that the voltage $E_{38}$ reverses and the current $I_{46}$ goes to zero. It will be refired each time that the voltage $E_{38}$ becomes positive as long as the frequency of the potential supplied to the terminals 2 and 4 remain below the desired frequency so that the pulse $E_{44}$ occurs during a time when the voltage $E_{38}$ is positive. If it is desired to have the relay 24 lock itself in an energized condition, additional contacts may be added to shunt the rectifier 26 in a consequence of the energization of the relay. If desired, a resistor may be shunt connected with the winding 18 in case its impedance is undesirably high.

Although the invention has been described with reference to a single embodiment thereof, numerous modifications are possible and it is desired to cover all modifications falling within the spirit and scope of the invention.

What is claimed and is desired to be secured by the United States Letters Patent is as follows:

1. A frequency responsive device comprising a pair of input terminals adapted to be connected to a source of alternating potential, a pulse forming means effective to provide an output pulse in at least corresponding half-cycles of an alternating potential electrical quantity supplied thereto, a frequency responsive phase shifting circuit, a first network connected between said terminals and including said pulse forming means and said phase shifting circuit, said phase shifting circuit being operable to alter the phase angle of said electrical quantity supplied to said pulse forming means with respect to the potential at said terminals as a function of the frequency of the potential at said terminals, a control device having a main circuit and a control circuit for transferring said main circuit between first and second operating conditions, first circuit means connecting said main circuit between said terminals, and second circuit means connecting said control circuit to said pulse forming means to receive said output pulses whereby said pulse forming means is effective to change the operating condition of said control device from said first to said second condition at a phase angle of the potential supplied to said terminals as determined by the phase of said quantity supplied by said frequency responsive circuit to said pulse forming means.

2. The combination of claim 1 in which said phase shifting circuit is effective to shift the time of the occurrence of said output pulse between time intervals which occur before and after the zero point in the voltage wave applied to said main circuit, said control device is polarity responsive whereby said control circuit is effective to change the operating condition of said main circuit from said first to said second condition solely at one polarity of the potential applied thereto.

3. The combination of claim 2 in which said control device is a thyratronic type switch with its main circuit defined by an anode element and a cathode element and effective to conduct solely when said anode element is positive with respect to said cathode element, said control circuit of said thyratronic switch extending between a control electrode and one of said elements, said frequency responsive phase shifting circuit being calibrated such that when the frequency of said alternating potential is within a first predetermined range the phase of said electrical quantity energizes said pulse forming means at a phase angle relative to the phase of said voltage wave between said anode element and cathode element such that said output pulse occurs between the angles 180° and 0° of said voltage wave and when the frequency of said alternating potential changes in one direction to a frequency outside of said range said output pulse occurs between the angles of 0° and 180° on said voltage wave.

4. The combination of claim 3 in which said one direction is in a direction of a reduction in said frequency.

5. A frequency responsive device comprising a pair of input terminals adapted to be energized from a source of alternating voltage, a frequency responsive phase shifting network having reactive components for phase shifting the current therethrough with respect to the potential supplied thereto, a transformer having a primary winding and a secondary winding and a core designed to saturate within the operating range of said primary winding, a first circuit connecting said network and said primary winding in series circuit between said terminals, a thyratronic type switch device having a main circuit and a control circuit for controlling the initiation of current through said main circuit, a controlled device, a second circuit connecting said devices in series circuit between said terminals, and a third circuit connecting said control circuit to said secondary winding for energization therefrom.

6. The combination of claim 4 in which there is provided asymmetric current means to render said secondary winding effective to supply its output potential to said control circuit solely during one polarity of the current flow through said primary winding, said switch device is a semiconductor device, and said controlled device is a relay.

7. The combination of claim 6 in which said frequency responsive network comprises a first inductive reactor series connected with a capacitive reactor and a second inductive reactor connected in shunt with said capacitive reactor, and in which said core has a hysteresis loop of substantially rectangular shape.

References Cited

UNITED STATES PATENTS

| 2,483,053 | 9/1949 | Isay | 317—147 X |
| 2,757,320 | 7/1956 | Schuh | 317—53 X |
| 3,075,127 | 1/1963 | Secunde et al. | 317—147 |
| 3,181,032 | 4/1965 | Myers | 317—33 |
| 3,209,212 | 9/1965 | Billings | 317—147 |

MILTON O. HIRSHFIELD, *Primary Examiner.*

J. A. SILVERMAN, *Assistant Examiner.*